(12) United States Patent
Caturla et al.

(10) Patent No.: US 11,099,096 B2
(45) Date of Patent: Aug. 24, 2021

(54) PRESSURE MEASUREMENT TOOL COMPRISING A SHEATH FOR INSTALLATION IN A DUCT OF AN AIRCRAFT ENGINE

(71) Applicant: Airbus Operations (S.A.S.), Toulouse (FR)

(72) Inventors: Jean-Pascal Caturla, Colomiers (FR); Nicolas Dupe, Cornebarrieu (FR); Olivier Sornique, Lias (FR)

(73) Assignee: Airbus Operations (S.A.S.), Toulouse (FR)

( * ) Notice: Subject to any disclaimer, the term of this patent is extended or adjusted under 35 U.S.C. 154(b) by 120 days.

(21) Appl. No.: 16/714,945

(22) Filed: Dec. 16, 2019

(65) Prior Publication Data

US 2020/0191676 A1 Jun. 18, 2020

(30) Foreign Application Priority Data

Dec. 17, 2018 (FR) ...................................... 1873077

(51) Int. Cl.
*G01L 19/14* (2006.01)
*B64F 5/60* (2017.01)

(52) U.S. Cl.
CPC .............. *G01L 19/147* (2013.01); *B64F 5/60* (2017.01)

(58) Field of Classification Search
None
See application file for complete search history.

(56) References Cited

U.S. PATENT DOCUMENTS

| | | | |
|---|---|---|---|
| 10,138,754 B2 | 11/2018 | Giordan et al. | |
| 2011/0030338 A1 | 2/2011 | Vauchel | |
| 2014/0037430 A1 | 2/2014 | Thorpe et al. | |
| 2018/0340444 A1 | 11/2018 | Jausovec et al. | |
| 2019/0289842 A1* | 9/2019 | Lopac ................... | A01M 29/34 |

FOREIGN PATENT DOCUMENTS

| | | | |
|---|---|---|---|
| FR | 2 929 998 A1 | 10/2009 | |
| FR | 3 043 775 A1 | 5/2017 | |
| FR | 3 066 779 A1 | 11/2018 | |
| WO | WO 2017/187108 A1 | 11/2017 | |

OTHER PUBLICATIONS

French Search Report for Application No. 1873077 dated Oct. 17, 2019.

\* cited by examiner

*Primary Examiner* — Andre J Allen
*Assistant Examiner* — Jermaine L Jenkins
(74) *Attorney, Agent, or Firm* — Jenkins, Wilson, Taylor & Hunt, P.A.

(57) ABSTRACT

A pressure measurement tool secured to a rod arranged across a duct of an engine of an aircraft. A sheath includes two walls which bound a space receiving the rod, the space communicating with the outside by an opening extending over the length of the sheath, the sheath having a bay extending over the length of the sheath and cavities distributed over the sheath. For each cavity, an air inlet including a passage opens at one end into the cavity another end into the duct. A printed circuit board runs along the bay. For each passage, a pressure sensor in the corresponding cavity faces the passage and is on the printed circuit board. A unit is provided for processing and/or recording the data transmitted by the pressure sensors. It is thus easy to install and makes it possible to take a large number of measurements in the secondary duct.

10 Claims, 5 Drawing Sheets

PRESSURE MEASUREMENT TOOL COMPRISING A SHEATH FOR INSTALLATION IN A DUCT OF AN AIRCRAFT ENGINE

CROSS-REFERENCE TO RELATED APPLICATION

This application claims priority to French patent application 18 73077 filed on Dec. 17, 2018, the entire disclosure of which is incorporated by reference herein.

TECHNICAL FIELD

The disclosure herein relates to a pressure measurement tool which comprises a sheath to enable it to be installed on a rod that crosses a duct of an engine, such as a secondary duct of a turbofan engine of an aircraft, and to an aircraft engine comprising a duct and at least one such pressure measurement tool, and to an aircraft comprising at least one such engine.

BACKGROUND

When a turbofan engine of the prior art is to be tested, it is necessary to measure the internal pressure, in particular within the secondary duct of this engine.

To that end, it is known to secure pressure probes inside the secondary duct. Probes of this kind are made of metal and are secured by fasteners which permanently change the walls of the secondary duct.

Probes of this kind also comprise pneumatic tubes, of which one end is inserted into the secondary duct and the other end is connected to a pressure sensor located some distance away, either on the nacelle or in the aircraft.

The space taken up by the pneumatic tubes in the secondary duct limits the number of these tubes, which in turn limits the number of measurement points.

SUMMARY

The disclosure herein has an object of a pressure measurement tool which comprises a sheath to enable it to be installed on a rod that crosses a duct of an engine of an aircraft, and to thus permit a greater number of measurement points without damaging the walls of the duct.

To that end, the subject matter herein discloses a pressure measurement tool intended to be secured to a rod arranged across a duct of an engine of an aircraft, the tool comprising:

a sheath consisting of or comprising two walls which bound a space intended for receiving the rod, the space communicating with the outside by an opening that extends over the length of the sheath between the two walls, the opening being narrower than the thickness of the rod, the sheath having a bay that extends over the length of the sheath and that has a plurality of cavities distributed over the length of the sheath;

for each cavity, an air inlet comprising a passage that opens at one end into the cavity of the bay and at one end into the duct;

a printed circuit board which runs along the bay;

for each passage, a pressure sensor arranged in the cavity corresponding to the passage and facing the passage and installed on the printed circuit board; and at least one unit for processing and/or recording the data transmitted by the pressure sensors, which unit is electrically connected to the bus.

A tool of this kind is thus easy to install and makes it possible to take a large number of measurements in the secondary duct.

Advantageously, the sheath has an aerodynamic cross section.

Advantageously, the sheath has a leading edge and a trailing edge when it is in place in the secondary duct, and the opening is arranged at the trailing edge.

Advantageously, each passage opens into the secondary duct upstream of the leading edge of the sheath.

Advantageously, the pressure measurement tool comprises a breathable membrane between the end of each passage and the corresponding cavity.

Advantageously, the bay opens to the outside via a window at one of the ends of the sheath, the printed circuit board being accessible from this window.

The subject matter herein also discloses an engine for an aircraft, the engine comprising a secondary duct, at least one reverser door that is able to move between a stowed position in which the reverser door is not across the secondary duct and a deployed position in which the reverser door is across the secondary duct, for each reverser door a rod secured in articulated fashion between the reverser door and a motor, where, in the stowed position, the rod is across the secondary duct, and, for at least one rod, a pressure measurement tool in accordance with one of the preceding variants, the rod being housed in the space.

Advantageously, the rod comprises a positioner that prevents the sheath from moving along the rod.

Advantageously, the positioner is an increase in the thickness of the rod.

The subject matter herein also discloses an aircraft comprising at least one turbofan engine in accordance with one of the above variants.

BRIEF DESCRIPTION OF THE DRAWINGS

The abovementioned features of the disclosure herein, along with others, will become more clearly apparent on reading the following description of one example embodiment, the description being given with reference to the appended drawings, in which.

DETAILED DESCRIPTION

In the following description, the terms relating to a position are considered with reference to the direction of advance of an aircraft.

Figure 1:
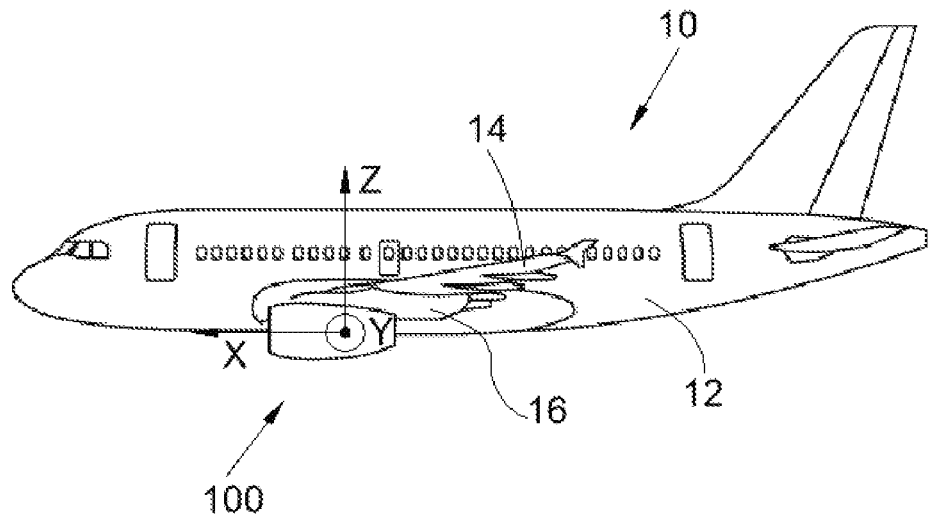
FIG. 1 is a side view of an aircraft according to the disclosure herein.

FIG. 1 shows an aircraft 10 that comprises a fuselage 12, to each side of which is fixed a wing 14 that bears an engine 100 and a pylon 16 by which the engine 100 is secured beneath the wing 14. In the following description, the disclosure herein is more particularly described in the context of a turbofan engine and a secondary duct of such a turbofan engine, but it may apply to any engine comprising a duct in which the pressure of a flow of air is to be measured.

In the following description, and by convention, X denotes the longitudinal axis of the turbofan engine 100 that is parallel to the longitudinal axis of the aircraft 10 and oriented positively toward the front of the aircraft 10, Y denotes the transverse axis which is horizontal when the aircraft 10 is on the ground, and Z denotes the vertical axis when the aircraft 10 is on the ground, these three axes X, Y and Z being mutually orthogonal.

Figure 2:
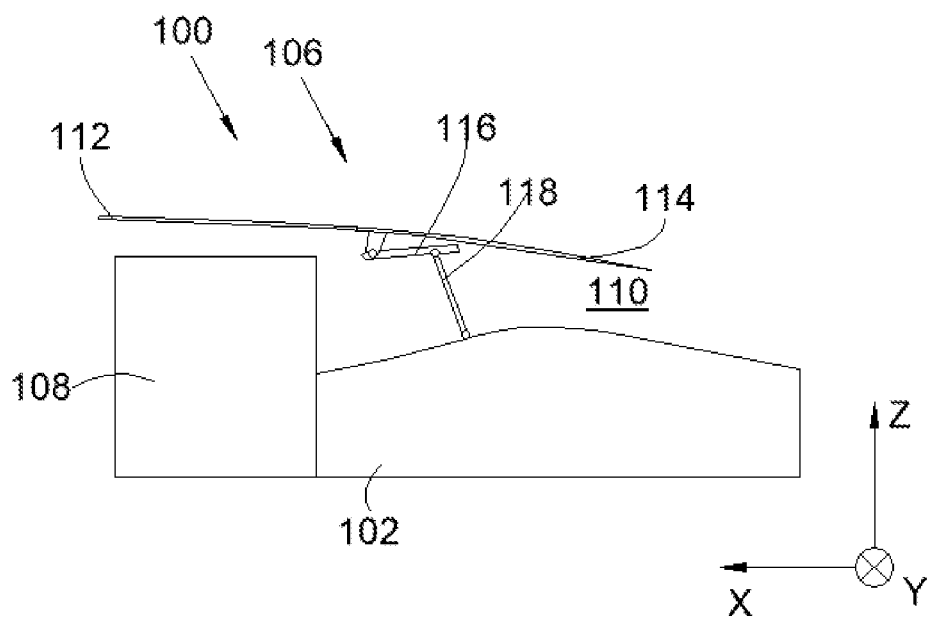
FIG. 2 is a side section view of a turbofan engine according to the disclosure herein.

FIG. 2 shows an example of a turbofan engine 100 in which the disclosure herein is implemented, but it is possible to implement the disclosure herein in another type of turbofan engine.

The turbofan engine 100 comprises a fan 108, a motor 102 forming a core and a nacelle 106 arranged around the motor 102. The motor 102 is arranged downstream of the fan 108.

A secondary duct 110 is delimited between the motor 102 and the nacelle 106.

The air entering through the fan 108 is split into a primary flow which passes through the motor 102 and a secondary flow which passes through the secondary duct 110.

The nacelle 106 comprises, around the fan 108, a fan casing 112 which is fixed and mobile cowls 114 which are to the rear of the fan casing 112, and where each one is able to move in translation in a direction of translation that is generally parallel to the longitudinal axis X of the turbofan engine 100.

Each mobile cowl 114 is able to move in translation with respect to the motor 102, between an advanced position and a retracted position. In the advanced position the mobile cowls 114 adjoin the rear of the fan casing 112, and in the retracted position the mobile cowls 114 are retracted with respect to the fan casing 112 and are at a distance from the fan casing 112 so as to open a window between the secondary duct 110 and the outside of the nacelle 106. The window is bounded at the front by the fan casing 112 and at the rear by the mobile cowls 114.

Each mobile cowl 114 is made to move by any appropriate structure such as sliders, actuators, etc.

The turbofan engine 100 also comprises a thrust reversal system which comprises at least one reverser door 116.

In this context, each reverser door 116 is mounted so as to be able to move in rotation on the mobile cowl 114, about an axis generally perpendicular to the longitudinal axis X.

Each reverser door 116 is able to move between a stowed position and a deployed position. In the stowed position, the reverser door 116 is not across the secondary duct 110 and therefore does not obstruct the passage of the secondary flow of air in the secondary duct 110. In the deployed position, the reverser door 116 is across the secondary duct 110 so as to deflect the flow of air toward the window which is opened between the secondary duct 110 and the outside of the nacelle 106.

For each reverser door 116, the reversal system also comprises a rod 118 which moves the reverser door 116 from the stowed position to the deployed position when the mobile cowl 114 passes from the advanced position to the retracted position. The rod 118 is secured in articulated fashion between the reverser door 116 and the motor 102.

When the mobile cowl 114 moves toward the retracted position, that part of the reverser door 116 which is secured to the mobile cowl 114 also retracts while that part of the reverser door 116 which is secured to the rod 118 is held and pivots so as to come against the motor 102.

Thus, in the stowed position, each rod 118 is across the secondary duct 110 and, in the deployed position, each rod 118 is practically flat against the motor 102.

Figure 3:
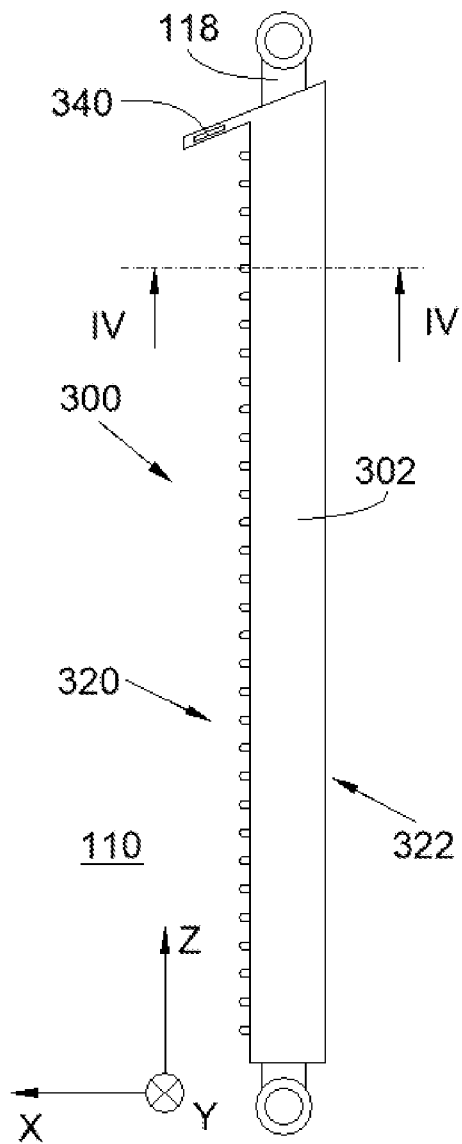
FIG. 3 is a side view of a rod equipped with a pressure measurement tool according to the disclosure herein.
Figure 4:
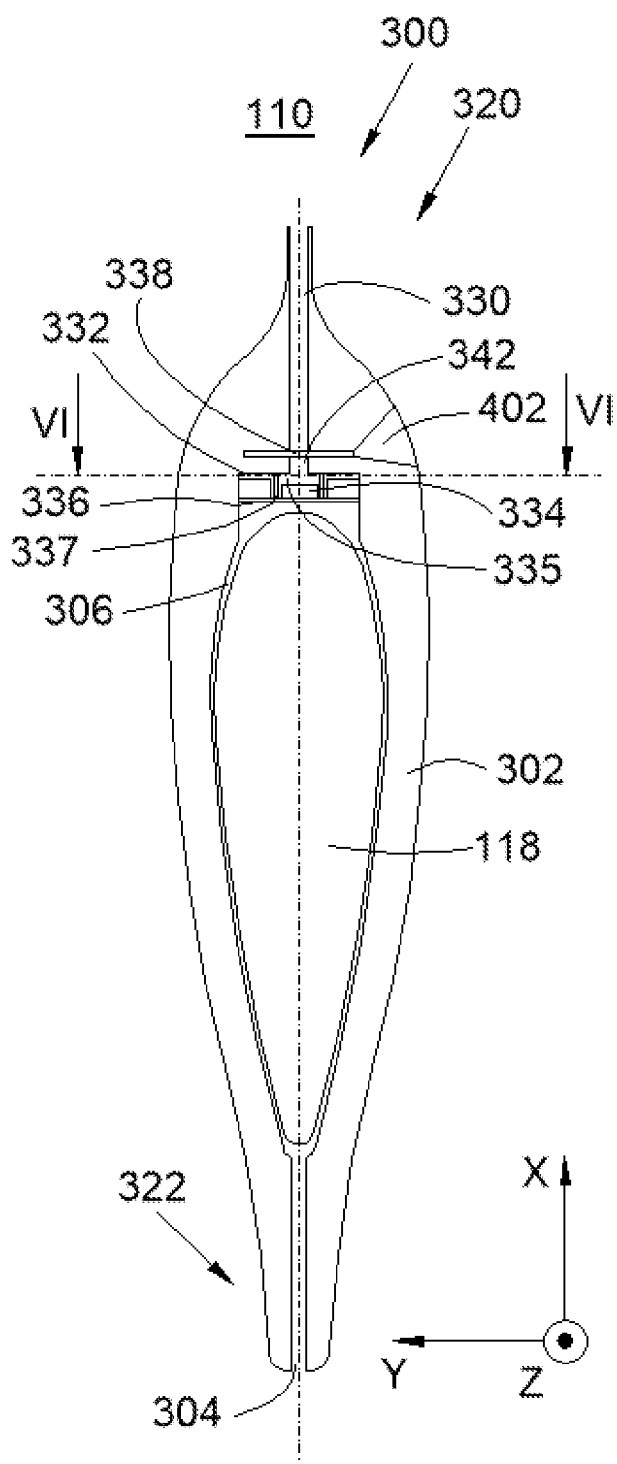
FIG. 4 is a view in section along the line IV-IV of FIG. 3.

FIG. 3 shows the rod 118 with an articulation point at each end and covered by a pressure measurement tool 300 according to the disclosure herein, and FIG. 4 shows the rod 118 and the tool 300 in section. The tool 300 is more particularly designed to measure pressures when the reverser door 116 is in the stowed position.

The rod 118 has an aerodynamic cross section around which the air of the secondary duct 110 flows.

The tool 300 comprises a sheath 302 consisting of or comprising two walls which bound a space 306 in which the rod 118 is received. The space 306 communicates with the outside of the sheath 302 by an opening 304 that extends over the length of the sheath 302 between the two walls.

Thus, each wall forms one arm of a pincer, between which the rod 118 is positioned.

The opening 304 between the two walls is narrower than the thickness of the rod 118 and the insertion of the rod 118 therefore requires elastic spreading of the walls and re-tightening when the rod 118 is in place in the space 306. This elastic deformation of the sheath 302 ensures that the tool 300 is held without it being necessary to provide additional elements.

If required, it is possible to adhesively bond the two edges of the opening 304, while permitting subsequent release of the adhesive for removal of the sheath 302.

Since the sheath 302 is positioned around the rod 118, its installation by taking the rod 118 out of the sheath 302, representing in this manner a non-intrusive system which disturbs neither the measurements nor the flow of air.

In order to limit the impact of the sheath 302 on the flow of air, the sheath 302 has an aerodynamic cross section which in this case is biconvex.

Since the sheath 302 extends on either side of the rod 118, the flow of air surrounding it gives rise to pressure around the sheath 302, as a result of which it is held more firmly.

In place on the rod 118 in the secondary duct 110, the sheath 302 has, with respect to the flow of air in the secondary duct 110, a forward-oriented leading edge 320 and a rearward-oriented trailing edge 322.

In order to limit the impact of the opening 304 on the flow, it is arranged at the trailing edge 322.

The sheath 302 also has a bay 332 which is created inside the sheath 302, which extends over the length of the sheath 302 and which in this case forms part of the space 306.

At the leading edge 320, the tool 300 comprises a plurality of air inlets, each one comprising a passage 330.

The air inlets are distributed over the length of the sheath 302 and the passages 330 are oriented generally parallel to the flow of air in the secondary duct 110.

For each passage 330, the bay 332 has an orifice 342 that extends the passage 330.

Thus, each passage 330 opens at one end into the bay 332 via, in this case, the orifice 342, and each passage 330 opens at another end into the secondary duct 110 upstream of the leading edge 320 of the sheath 302. Each orifice 342 allows the flow of air from each passage 330 to pass through.

For each passage 330, the tool 300 comprises a pressure sensor 334, for example of the MEMS (microelectromechanical systems) type, which is arranged in the bay 332 facing the passage 330 so as to measure the pressure prevailing in the passage 330 and thus in the secondary duct 110 at the level of this passage 330. Each pressure sensor 334 is installed on a printed circuit board 336.

For each pressure sensor 334, and thus each passage 330, the bay 332 has a cavity 335 which is in fluidic communication with the passage 330 and which is fluidically isolated from the other cavities 335, and in which the pressure sensor 334 is housed. In this case, each cavity 335 is bounded by supporting walls 337 which surround the pressure sensor 334. This cavity 335 avoids the pressure measurements of a pressure sensor 334 being affected by the other passages 330.

Figure 6:
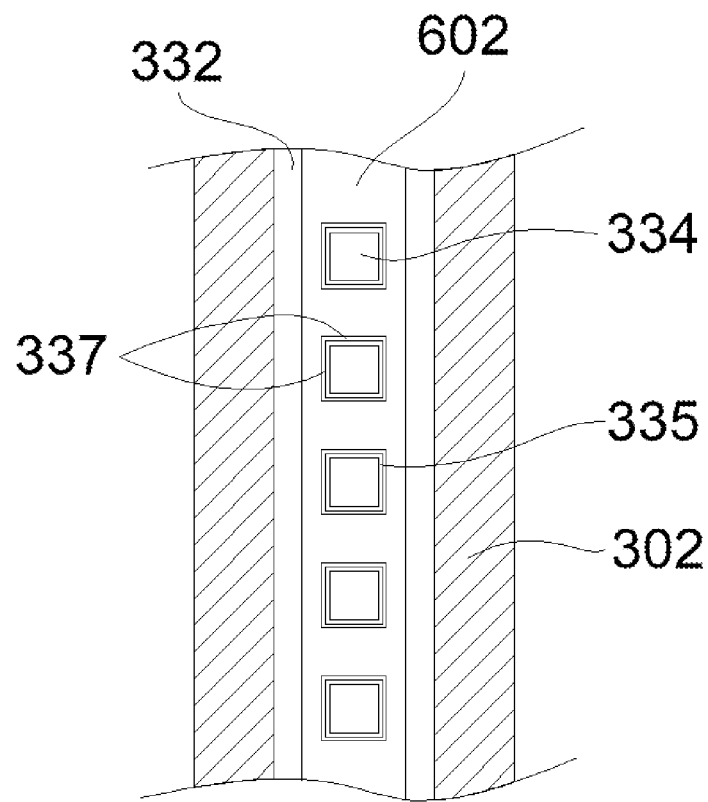
FIG. 6 is a view in section along the line VI-VI of FIG. 4.

FIG. 6 shows the supporting walls 337 which delimit or define each cavity 335 on all four sides thereof, with the pressure sensor 334 arranged between the supporting walls 337.

Figure 7:
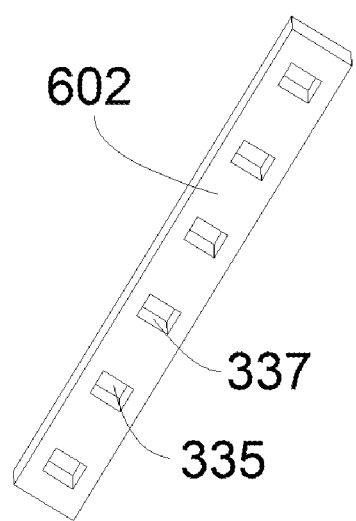
FIG. 7 is a perspective view of a component of the measurement tool according to the disclosure herein.

FIG. 7 shows an embodiment where all of the supporting walls 337 are secured to a base 602 which runs along the length of the bay 332 and which has a hole at each cavity 335.

The base 602 and the supporting walls 337 may be created together by moulding and may be created for example from an elastomer of the silicone seal type. A seal of this kind thus makes it possible to ensure insulation of the cavities 335 by filling the bay 332 around the pressure sensor 334 and, in particular, by pressing against the printed circuit board 336.

Thus, in general terms, the sheath 302 has the bay 332 which extends over the length of the sheath 302 and which has a plurality of cavities 335 distributed over the length of the sheath 302. Moreover, for each cavity 335 there is an air inlet comprising a passage 330 that opens at one end into the cavity 335 of the bay 332 and at one end into the duct 110 and, for each passage 330, a pressure sensor 334 arranged in the cavity 335 corresponding to the passage 330 and facing the passage 330, and installed on the printed circuit board 336.

The pressure sensors 334 are installed on a printed circuit board 336 that runs in the bay 332 along the length of the sheath 302.

The printed circuit board 336 comprises, in particular, a data bus and a power supply.

According to one particular embodiment, the printed circuit board 336 is flexible.

In the embodiment of the disclosure herein shown in FIG. 4, the supporting walls 337 of the cavities 335 extend as far as the printed circuit board 336.

The tool 300 comprises a unit for processing and/or recording the data transmitted by the pressure sensors 334, which sensors are directly installed on the printed circuit board 336.

In general terms, the unit for processing and/or recording the data is electrically connected to the printed circuit board 336.

In the embodiment of the disclosure herein presented here, the bay 332 opens to the outside via a window 340 at one of the ends of the sheath 302, the printed circuit board 336 being accessible from this window.

For sealing reasons, the other end of the bay 332 is closed. In particular, the end close to the motor 102 is closed and the end oriented toward the reverser door 116 is open.

Figure 5:
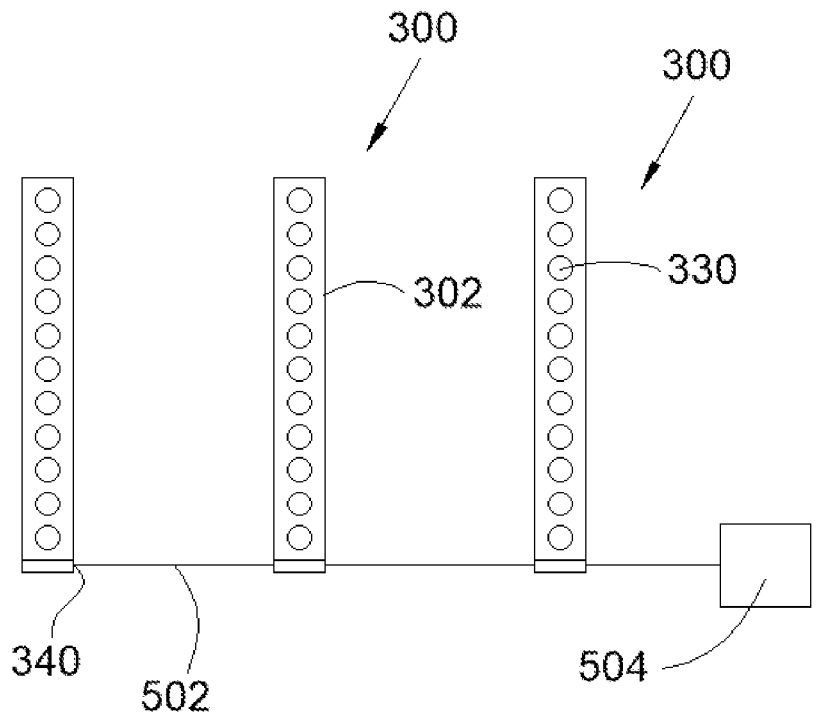
FIG. 5 is a representation of an installation comprising multiple pressure measurement tools in a network.

FIG. 5 shows an assembly of multiple pressure measurement tools 300 which are for example installed in a single secondary duct 110, on different rods 118.

The printed circuit boards 336 of the various pressure measurement tools 300 are connected to one another by cables 502, for example flat cables. A cable may extend within the engine 100 as far as a processing and/or display system 504 arranged in the cabin, in order to permit recovery of the data and supply of power to the printed circuit boards 336.

The unit for processing and/or recording the data can be replaced with a processing and/or display system and thus be located outside the sheath 302.

In the embodiment of the disclosure herein shown in FIG. 3, the sheath 302 extends over the entire length of the rod 118, but it is possible to limit the length of the sheath 302 to a part of the rod 118.

In order to keep the sheath in position, it is then possible to have a positioner or positioners along the length of the rod 118, preventing the sheath 302 from moving along the rod 118. The positioner(s) is for example an increase in the thickness of the rod 118, which prevents the sheath 302 from moving.

In the embodiment of the disclosure herein shown in FIG. 4, the tool 300 comprises, upstream of each pressure sensor 334, across the passage 330 corresponding to the pressure sensor 334, a breathable membrane 338 through which air can pass but not liquids or solid bodies. Thus, the membrane 338 is arranged between the bay 332, more particularly the orifice 342, and the end of each passage 330.

In the embodiment of the disclosure herein shown in FIG. 4, the membrane 338 is arranged in a slot and the sheath 302 has a sliding portion 402 which serves to open the slot and allow access to the slot from the outside, so as to be able to insert the membrane 338.

Of course, other embodiments are possible in order to permit the insertion of the membrane 338 into the slot. For example, it is possible to remove that part of the sheath 302 which is to the rear of the slot, that is to say the part comprising the supporting walls 337.

The material of the sheath 302 must be flexible enough to allow the insertion and removal of the rod 118 without deformation, and rigid enough to grip the rod 118 when the latter is in the space 306. One such material is polyamide PA12.

The number of pressure sensors 334 can vary, but according to one embodiment it is possible to have one pressure sensor 334 every 2 cm, for example.

Each pressure sensor 334 may for example be equipped with device(s) that allow a measurement of temperature, thus making it possible to improve understanding of the flow in the secondary duct 110.

In the arrangement provided in the figures, pressure measurements are taken along the leading edge, but it is also possible to take pressure measurements elsewhere than the leading edge and thus to spread the measurements over the surface of the sheath 302.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pressure measurement tool to be secured to a rod arranged across a duct of an engine of an aircraft, the tool comprising:

a sheath comprising two walls which bound a space for receiving the rod, the space communicating with an outside by an opening that extends over a length of the sheath between the two walls, the opening being narrower than a thickness of the rod, the sheath having a bay that extends over the length of the sheath and that has a plurality of cavities distributed over the length of the sheath;

for each cavity, an air inlet comprising a passage that opens at one end into the cavity of the bay and at one end into the duct;

a printed circuit board which runs along the bay;

for each passage, a pressure sensor arranged in a cavity corresponding to the passage and facing the passage and installed on the printed circuit board; and at least one unit for processing and/or recording data transmitted by the pressure sensors, which unit is electrically connected to the printed circuit board.

2. The pressure measurement tool of claim 1, wherein the sheath has an aerodynamic cross section.

3. The pressure measurement tool of claim 1, wherein the sheath has a leading edge and a trailing edge when it is in place in the secondary duct, and wherein the opening is arranged at the trailing edge.

4. The pressure measurement tool of claim 3, wherein each passage opens into the secondary duct upstream of the leading edge of the sheath.

5. The pressure measurement tool of claim 1, comprising a breathable membrane between an end of each passage and a corresponding cavity.

6. The pressure measurement tool of claim 1, wherein the bay opens to the outside via a window at one of the ends of the sheath, the printed circuit board being accessible from the window.

7. An engine for an aircraft, the engine comprising a secondary duct, at least one reverser door that movable between a stowed position in which the reverser door is not across the secondary duct and a deployed position in which the reverser door is across the secondary duct, for each reverser door a rod secured in articulated fashion between the reverser door and a motor, where, in the stowed position, the rod is across the secondary duct, and, for at least one rod, a pressure measurement tool of claim 1, the rod being housed in the space.

8. The engine of claim 7, wherein the rod comprises a positioner that prevents the sheath from moving along the rod.

9. The engine of claim 8, wherein the positioner comprises an increase in thickness of the rod.

10. An aircraft comprising at least one engine according to claim 7.

* * * * *